(12) United States Patent
Taguchi

(10) Patent No.: US 7,052,431 B2
(45) Date of Patent: May 30, 2006

(54) AUTOMATIC TRANSMISSION

(75) Inventor: Yusho Taguchi, deceased, late of Sendai (JP); by Setsuko Taguchi, legal representative, Sendai (JP)

(73) Assignee: JATCO Ltd, Fuji (JP)

( * ) Notice: Subject to any disclaimer, the term of this patent is extended or adjusted under 35 U.S.C. 154(b) by 205 days.

(21) Appl. No.: 10/619,559

(22) Filed: Jul. 16, 2003

(65) Prior Publication Data

US 2005/0170928 A1 Aug. 4, 2005

(30) Foreign Application Priority Data

Jul. 16, 2002 (JP) ............................. 2002-207345

(51) Int. Cl.
*F16H 3/44* (2006.01)

(52) U.S. Cl. ..................... 475/284; 475/313; 475/325

(58) Field of Classification Search ................ 475/284, 475/311, 313, 323, 325, 275
See application file for complete search history.

(56) References Cited

U.S. PATENT DOCUMENTS

| | | | |
|---|---|---|---|
| 6,110,069 A * | 8/2000 | Taniguchi et al. ........... | 475/330 |
| 6,790,155 B1 | 9/2004 | Ishimaru | |
| 6,863,635 B1 | 3/2005 | Tsuga | |
| 6,878,087 B1 | 4/2005 | Tsuga | |
| 2004/0014549 A1 | 1/2004 | Choi | |
| 2004/0014552 A1 | 1/2004 | Ikeda | |
| 2004/0014554 A1 | 1/2004 | Ishimaru | |

FOREIGN PATENT DOCUMENTS

| | | | |
|---|---|---|---|
| JP | 52-44371 | | 4/1977 |
| JP | 1-132844 U | | 9/1989 |
| JP | 407317853 A | * | 12/1995 |
| JP | 411037230 A | * | 2/1999 |
| JP | 2000-055152 A | | 2/2000 |

* cited by examiner

*Primary Examiner*—Tisha D. Lewis
(74) *Attorney, Agent, or Firm*—Foley & Lardner LLP

(57) ABSTRACT

An automatic transmission, which has at least six selectable forward speeds, includes a reduction planetary gearset that reduces speed of rotation input from an engine, a plurality of planetary gearsets disposed behind the reduction planetary gearset, a plurality of clutches that are disposed radially beyond the plurality of planetary gearsets, and a plurality of brakes that are disposed radially beyond the plurality of clutches. The plurality of planetary gearsets includes a ring gear as an input member that inputs reduced rotation from the reduction planetary gearset. Individually, planetary gearsets include a single set of pinion gears. The forward speeds of the transmission are selectable through a combination of engagement and disengagement of the plurality of clutches and the plurality of brakes. Each brake overlaps with a corresponding clutch in the axial direction.

16 Claims, 8 Drawing Sheets

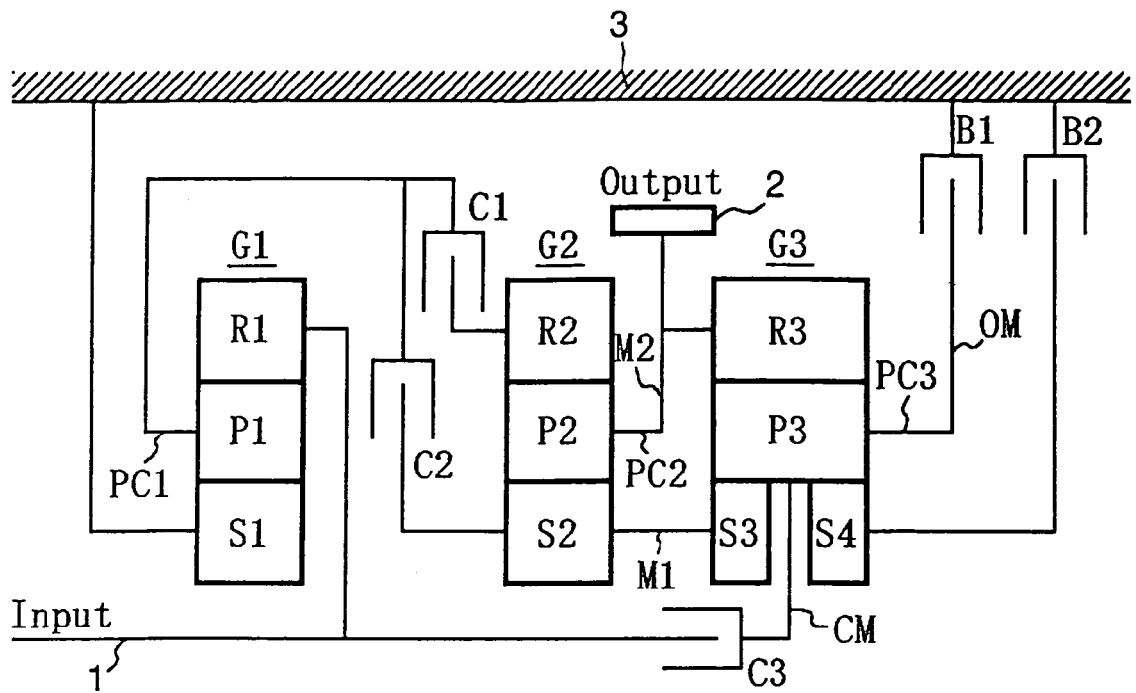

AUTOMATIC TRANSMISSION

BACKGROUND OF THE INVENTION

The present invention relates to an automatic transmission. In particular, it relates to technology which aims to increase the compactness of an automatic transmission comprising an input member, a plurality of planetary gearsets, three clutches, two brakes, and an output member, with at least six forward gears and reverse being attainable through appropriate engagement and disengagement of the three clutches and two brakes.

The recent trend is to make automatic transmissions which are more stepped or graduated to provide slightly more forward gear ratios that can be selected in an aim for improvement in drivability and fuel efficiency. Japanese Patent Provisional Application 2000-55152 discloses an automatic transmission where six forward speeds and reverse are selectable and employs a double-pinion type Ravigneaux compound planetary gear train which has two sets of planet-pinions, each set being meshed with a different sun gear, and will now be discussed with reference to FIG. 9. The automatic transmission disclosed therein comprises a first clutch C10 and a second clutch C20 which are selectably engageable to direct rotation that has been reduced in speed. The automatic transmission also comprises a planetary gear train G, which as has been stated is a Ravigneaux compound type, and it is common to dispose first clutch C10 and second clutch C20 behind and around planetary gear train G, and to dispose a first brake B10, in this case a band brake as shown in FIG. 9, about an outer circumference of first clutch C10 and second clutch C20, and to dispose a second brake B20 in a single row with first clutch C10 and second clutch C20.

However, according to the related art, first clutch C10, second clutch C20, and second brake B20, which is a clutch-type brake, are disposed in a row in the axial direction of the transmission assembly around an outer periphery of planetary gear train G, and this leads to a problem of the axial length of the transmission assembly being large. Also, one of the planetary gearsets constituting planetary gear train G is a double-pinion planetary gearset, and rotation having an increased torque after being reduced in speed by the reduction planetary gearset is input to planetary gear train G from a first sun gear S10 and a second sun gear S20 thereof, meaning that an outer diameter of planetary gear train G must be large, and consequently the transmission assembly becomes undesirably large overall.

It is therefore an object of the present invention to provide an automatic transmission which is more compact in both the axial and radial dimensions.

SUMMARY

An aspect of the present invention resides in an automatic transmission which has at least six selectable forward speeds, the automatic transmission comprising a reduction planetary gearset which reduces speed of rotation input from an engine, a plurality of planetary gearsets disposed behind the reduction planetary gearset, the plurality of planetary gearsets comprising a ring gear as an input member which inputs reduced rotation from the reduction planetary gearset, individual planetary gearsets respectively comprising a single set of pinion gears, a plurality of clutches which are disposed radially beyond the plurality of planetary gearsets, and a plurality of brakes which are disposed radially beyond the plurality of clutches, the forward speeds of the transmission being selectable through a combination of engagement and disengagement of the plurality of clutches and the plurality of brakes, each brake overlapping with a corresponding clutch in the axial direction.

Another aspect of the present invention resides in an automatic transmission which has at least six selectable forward speeds, the automatic transmission comprising a reduction planetary gearset, a rear planetary gear train disposed behind the reduction planetary gearset, the rear planetary gear train comprising a first rear planetary gearset which is disposed behind the reduction planetary gearset to receive a reduced rotation therefrom, the first rear planetary gearset comprising a sun gear, a single set of pinion gears meshing with the sun gear, and a ring gear meshing with the single set of pinion gears, the ring gear being an input member which inputs the reduced rotation from the reduction planetary gearset, and a second rear planetary gearset which is disposed behind the first rear planetary gearset, the second rear planetary gearset comprising a single set of pinion gears, a plurality of clutches disposed in a row around the rear planetary gear train, and a plurality of brakes disposed in a row around the plurality of clutches, the plurality of brakes comprising a first brake which overlaps in the axial direction with a first clutch of the plurality of clutches, and a second brake which overlaps in the axial direction with a second clutch of the plurality of clutches.

A further aspect of the present invention resides in an automatic transmission comprising an input member which inputs an engine rotation, a planetary gear train to receive the engine rotation from the input member, the planetary gear train comprising a first planetary gearset acting as a reduction planetary gearset which inputs the engine rotation from the input member, a second planetary gearset disposed behind the first planetary gearset, the second planetary gearset comprising a sun gear, planetary pinions which mesh with the sun gear, a pinion carrier which supports the planetary pinions to be freely rotatable, and a ring gear which meshes with the planetary pinions, the ring gear acting as an input member which inputs reduced rotation from the first planetary gearset, and a third planetary gearset disposed behind the second planetary gearset, the third planetary gearset comprising two sun gears, common planetary pinions which mesh with the two sun gears, a pinion carrier which supports the planetary pinions to be freely rotatable, and a ring gear which meshes with the planetary pinions, an output member disposed coaxially with the input member, the output member receiving a rotation from the planetary gear train, and three clutches and two brakes, at least six forward speeds and reverse speed being selectable by selective engagement and disengagement of the three clutches and the two brakes, two clutches of the three clutches being disposed around the planetary gear train, the two brakes being disposed around the two clutches, one clutch of the two clutches and one brake of the two brakes overlapping in the axial direction at least partially, the other clutch of the two clutches and the other brake of the two brakes overlapping in the axial direction at least partially.

The other objects and features of this invention will become understood from the following description with reference to the accompanying drawings.

BRIEF DESCRIPTION OF THE DRAWINGS

FIG. 1 is a skeleton diagram of an embodiment of the present invention.

FIG. 2 is a chart diagram of engagement logic showing a relationship between selectable gears and engagement of transmission friction elements of the same automatic transmission.

DETAILED DESCRIPTION OF THE INVENTION

Figure 3A:
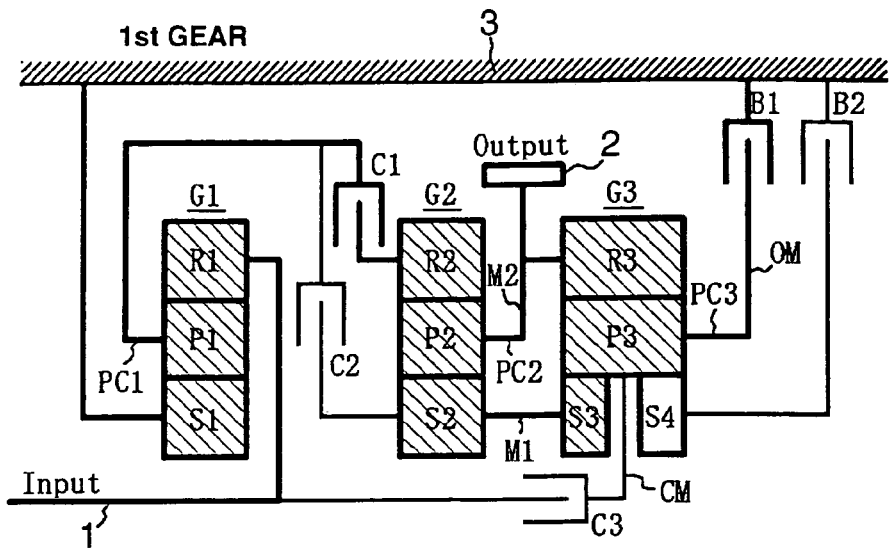
FIG. 3A is a skeleton diagram showing power flow of torque in a first forward gear in the same automatic transmission.

Referring to FIGS. 1 through 8, there is discussed an embodiment of an automatic transmission in accordance with the present invention.

Referring to FIG. 1, an automatic transmission according to the present invention for use in an automobile comprises a first planetary gearset G1, a second planetary gearset G2, a third planetary gearset G3, a first connecting member M1, a second connecting member M2, a first clutch C1, a second clutch C2, a third clutch C3, a first brake B1, a second brake B2, an input member Input, being an input shaft 1, and an output member Output, being an output gear 2. The disposition and relationships of these elements will now be explained.

The embodiment of the automatic transmission comprises, starting from the left of FIG. 1 near input member Input, first planetary gearset G1 as a reduction mechanism comprised of a single-pinion planetary gearset having a single set of planet-pinions, second planetary gearset G2 comprised of a single-pinion planetary gearset also having a single set of planet-pinions, and third planetary gearset G3 comprised of a double-sun-gear planetary gearset having two sun gears, all being disposed coaxially. First planetary gearset G1 functions as a reduction planetary gearset, and second planetary gearset G2 and third planetary gearset G3 constitute a compound planetary gear train located in a rear portion of the transmission.

First planetary gearset G1, which is a single-pinion planetary gearset serving as a reduction planetary gearset, is comprised of a first sun gear S1, a first ring gear R1, first planet-pinions P1 which mesh with first sun gear S1 and first ring gear R1, and a first carrier PC1 which supports first planet-pinions P1 to be freely rotatable. Second planetary gearset G2 is a single-pinion planetary gearset comprised of a second sun gear S2, a second ring gear R2, second planet-pinions P2 which mesh with second sun gear S2 and second ring gear R2, and a second carrier PC2 which supports second planet-pinions P2 to be freely rotatable.

Third planetary gearset G3 is a double-sun-gear planetary gearset comprised of a third sun gear S3 and a fourth sun gear S4, third planet-pinions P3 which mesh both with third sun gear S3 and fourth sun gear S4, a third carrier PC3 which supports third planet-pinions P3 to be freely rotatable, and a third ring gear R3 which meshes with third planet-pinions P3. Third sun gear S3 and fourth sun gear S4 are disposed such that third sun gear S3 is nearer input member Input than fourth sun gear S4. Third sun gear S3 and fourth sun gear S4 are disposed coaxially, but it is not necessary for third sun gear S3 and fourth sun gear S4 to have the same number of teeth. An automatic transmission according to the present invention also comprises a center member CM and an outer member OM joined to third carrier PC3, center member CM extending radially inward toward the axis from between third sun gear S3 and fourth sun gear S4, and outer member OM extending radially outward away from the axis. Outer member OM is uniquely disposed, and this will be discussed in more detail. Further, center member CM extends radially inward toward the axis so that it passes through space existing between individual planet-pinions of third planet-pinions P3.

Input member Input comprises input shaft 1, and input shaft 1 is joined to first ring gear R1, and is coupled to an engine (not shown) through a torque converter (not shown), so that engine rotation is input into first ring gear R1 from input shaft 1. Output member Output comprises output gear 2, and is joined coaxially to second connecting member M2 which serves to join second carrier PC2 and third ring gear R3. Output rotation from the transmission is transmitted, for example, from output gear 2 to counter gear 30 shown in FIG. 6, then on to a final gear and differential gear apparatus (neither of which shown) to the drive wheels of an automobile. Further, first connecting member M1 serves to join second sun gear S2 and third sun gear S3 to form a single integral body.

First sun gear S1 of reduction planetary gearset G1 is permanently fixed to transmission case 3, and first carrier PC1 is appropriately joinable to second ring gear R2 by first clutch C1 and is appropriately joinable to second sun gear S2 by second clutch C2. Center member CM of third carrier PC3 is appropriately joinable to input shaft 1 by third clutch C3, and therefore third clutch C3 serves as a direct clutch to transmit input rotation directly to the compound planetary gear train comprised of second planetary gearset G2 and third planetary gearset G3. Outer member OM of third carrier PC3 of third planetary gearset G3, which is a double-sun-gear planetary gearset, is appropriately joinable to transmission case 3 by first brake B1 so that third carrier PC3 is made appropriately fixable, and fourth sun gear S4 is made appropriately fixable to transmission case 3 by second brake B2.

It is possible to select gears, i.e., forward speeds 1st through 6th and reverse, with the gearshift assembly of the present invention through the corresponding combinations of friction elements first clutch C1, second clutch C2, third-clutch C3, first brake B1, and second brake B2, as shown by the engagement logic table in FIG. 2, where engagement is represented by a circle mark and disengagement by being unmarked. A control valve body for controlling gear shift (not shown) is connected to first clutch C1, second clutch C2, and third clutch C3 as well as first brake B1 and second brake B2 to realize the engagement logic. A hydraulic type, an electronic type, or a combination type which combines these two types are employable as a control valve body for control of gear shift.

Figure 4A:
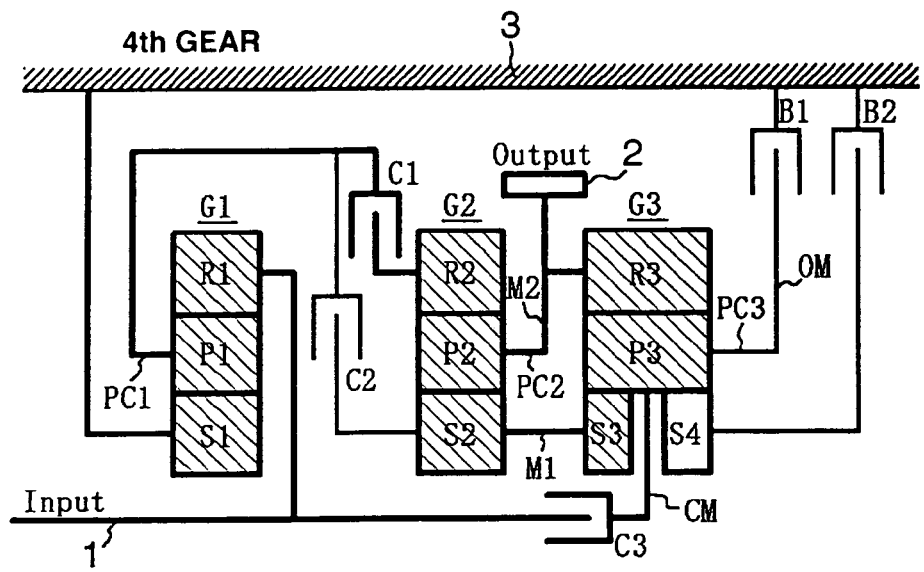
FIG. 4A is a skeleton diagram showing power flow of torque in a fourth forward gear in the same automatic transmission.
Figure 4B:
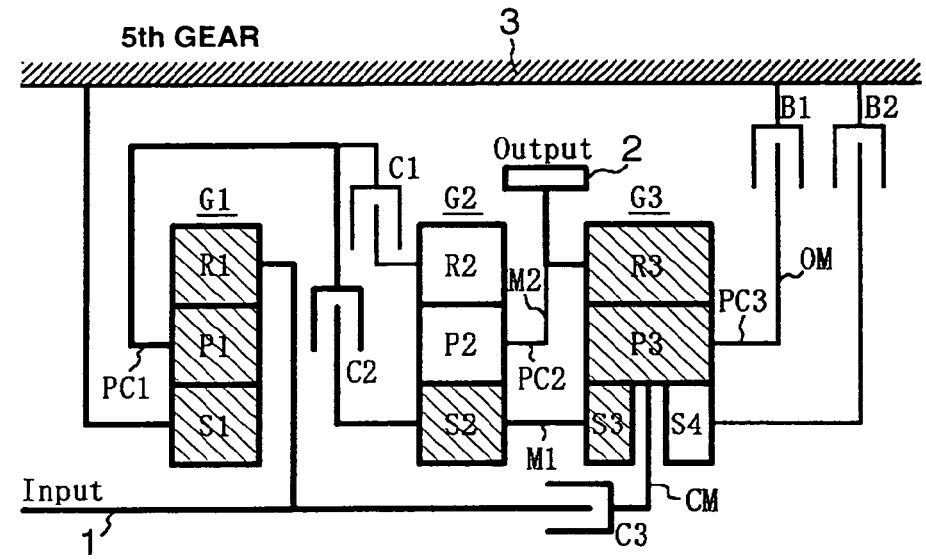
FIG. 4B is a skeleton diagram showing power flow of torque in a fifth forward gear in the same automatic transmission.
Figure 4C:
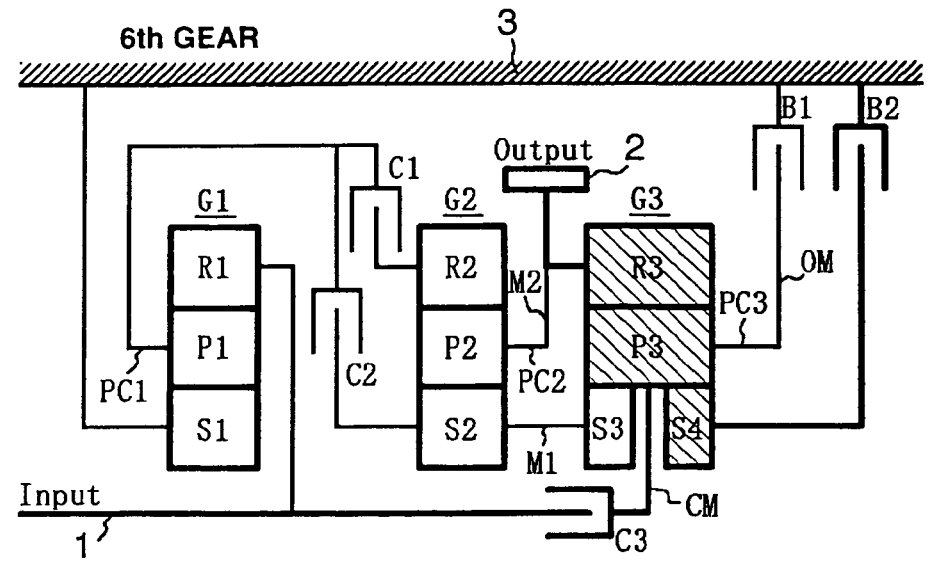
FIG. 4C is a skeleton diagram showing power flow of torque in a sixth forward gear in the same automatic transmission.
Figure 5:
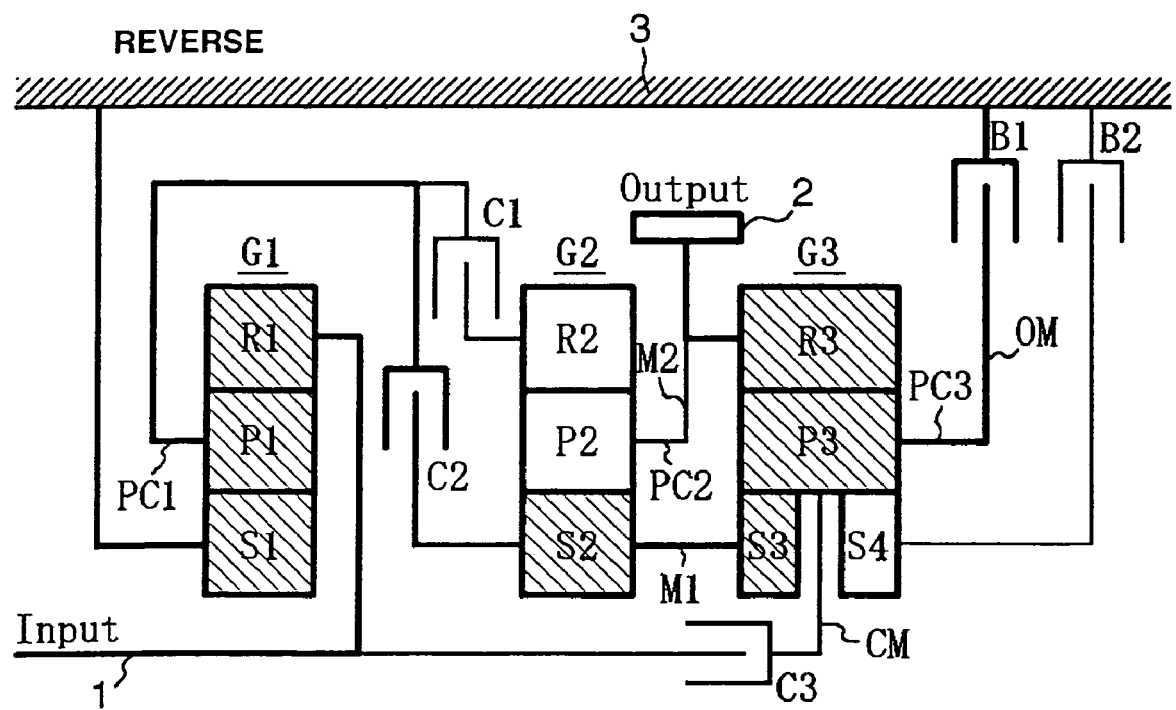
FIG. 5 is a skeleton diagram showing power flow of torque in a reverse gear in the same automatic transmission.

Below, operation of an automatic transmission according to the present invention will be discussed with reference to FIGS. 2 through 5. In FIGS. 3 through 5, the power flow of torque through first clutch C1, second clutch C2, third clutch C3, first brake B1, second brake B2, center member CM, and outer member OM is indicated by thick lines, and gears which participate in torque transmission are indicated by hatching.

(First gear) As shown by FIG. 2, first gear is achieved through engagement of first clutch C1 and first brake B1. In first gear, reduced rotation from first planetary gearset G1 is input into second ring gear R2 of second planetary gearset G2 by engagement of first clutch C1. At the same time, third carrier PC3 of third planetary gearset G3 is fixed to transmission case 3 by engagement of first brake B1, so rotation becomes a reverse-direction reduced rotation. Rotation of third sun gear S3 is then transmitted to second sun gear S2 of second planetary gearset G2 via first connecting member M1. Thus, at second planetary gearset G2, a normal-direction reduced rotation is input from second ring gear R2, and a reverse-direction reduced rotation is input from second sun gear 52, and as a result, a rotation which is a further reduced rotation from second ring gear R2 is output to output gear 2 via second connecting member M2 from second carrier PC2.

The power flow in first gear is as shown in FIG. 3A. Torque acts through first clutch C1, first brake B1, first connecting member M1, and second connecting member M2, shown in bold lines, and first planetary gearset G1, second planetary gearset G2, and third planetary gearset G3 not including fourth sun gear S4, shown in hatching. Therefore, in first gear, all planetary gearsets are involved in transmission of torque, that is, first planetary gearset G1, as well as second planetary gearset G2 and third planetary gearset G3 which make up the compound planetary gear train located in the rear portion of the transmission.

(Second gear) As shown by FIG. 2, in second gear, first brake B1 which was engaged in first gear is disengaged, and second brake B2 is engaged instead. Therefore, second gear is achieved through engagement of first clutch C1 and second brake B2. In second gear, reduced rotation from first planetary gearset G1 is input into second ring gear R2 of second planetary gearset G2 by engagement of first clutch C1. At the same time, fourth sun gear S4 of third planetary gearset G3 is fixed to transmission case 3 by engagement of second brake B2, so third sun gear S3 connected to fourth sun gear S4 by third planet-pinions P3 is fixed. Second sun gear S2 which is joined to third sun gear S3 by first connecting member M1 is then fixed to transmission case 3. Thus, at second planetary gearset G2, normal-direction reduced rotation is input from second ring gear R2, and second sun gear S2 is fixed, and as a result, a reduced rotation from second ring gear R2 which has been further reduced is output to output gear 2 through second connecting member from second carrier PC2. This rotation is faster than the rotation in first gear.

Figure 3B:
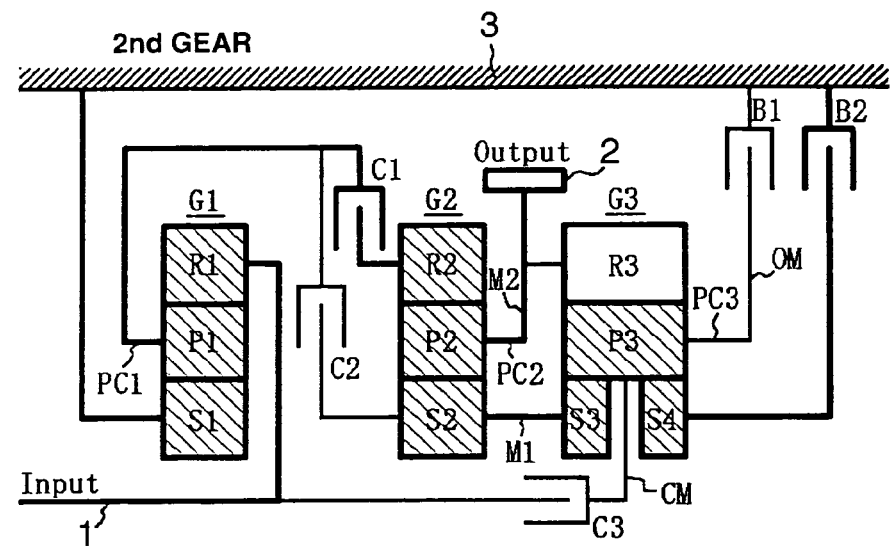
FIG. 3B is a skeleton diagram showing power flow of torque in a second forward gear in the same automatic transmission.

The power flow in second gear is as shown in FIG. 3B. Torque acts through first clutch C1, second brake B2, first connecting member M1, and second connecting member M2, shown in bold lines, and first planetary gearset G1 and second planetary gearset G2, shown in hatching. Further, regarding third planetary gearset G3, third planet-pinions P3, which are not constrained, are made to revolve accompanying output rotation of third ring gear R3, and thus revolve about third sun gear S3 and fourth sun gear S4 which are both fixed. Also, torque which constrains second sun gear S2 acts through first connecting member M1, third sun gear 53, third planet-pinions P3, and fourth sun gear S4.

Figure 3C:
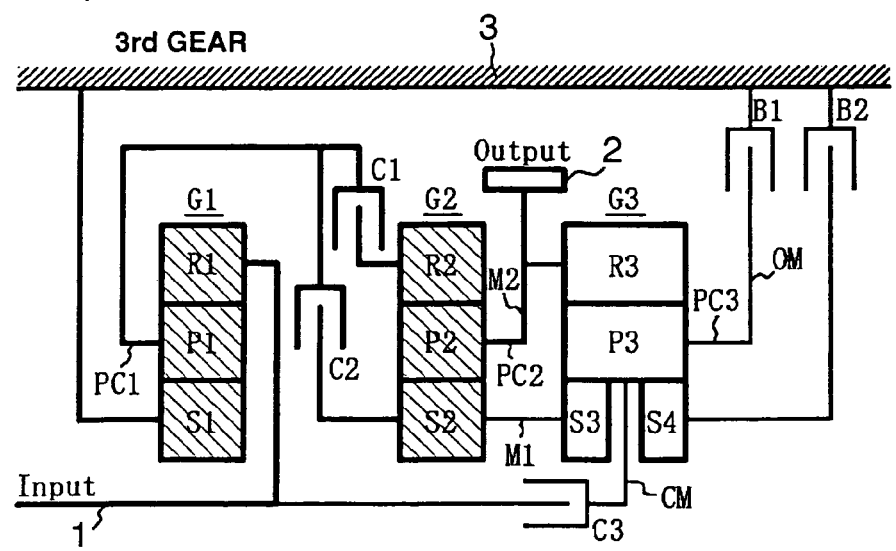
FIG. 3C is a skeleton diagram showing power flow of torque in a third forward gear in the same automatic transmission.

(Third gear) In third gear, as shown in FIG. 2, second brake B2 which was engaged in second gear is disengaged, and second clutch C2 is engaged instead. Therefore, third gear is achieved through engagement of first clutch C1 and second clutch C2. In third gear, reduced rotation from first planetary gearset G1 is input into second ring gear R2 of second planetary gearset G2 by engagement of first clutch C1. Simultaneously, by engagement of second clutch C2, this reduced rotation is input into second sun gear S2 of second planetary gearset G2. Thus, at second planetary gearset G2, by the same reduced rotation being input from second ring gear R2 and second sun gear S2, second carrier PC2 rotates integrally therewith, and a reduced rotation which is the same as the reduced rotation from planetary gearset G1 is input to output gear 2 through second connecting member M2. The power flow in third gear is as shown in FIG. 3C. Torque acts through first clutch C1, second clutch C2, and second connecting member M2, shown in bold lines, and first planetary gearset G1 and second planetary gearset G2, shown in hatching. Third planetary gearset G3 does not participate in transmission of torque.

(Fourth gear) In fourth gear, as shown in FIG. 2, second clutch C2 which was engaged in third gear is disengaged, and third clutch C3 is engaged instead. Therefore, fourth gear is achieved by engagement of first clutch C1 and third clutch C3. In fourth gear, reduced rotation from first planetary gearset G1 is input into second ring gear R2 of second planetary gearset G2 by engagement of first clutch C1. At the same time, input rotation from input shaft 1 is input into third carrier PC3 of third planetary gearset G3 through center member CM by engagement of third clutch C3. As a result, rotation of third sun gear S3 is faster than output rotation of third ring gear R3, and this faster rotation of third sun gear S3 is transmitted to second sun gear S2 through first connecting member M1.

Thus, at second planetary gearset G2, reduced rotation from second ring gear R2 is input, and faster rotation is input from second sun gear S2, and as a result, rotation which is a faster reduced rotation from second ring gear R2 is output to output gear 2 from second carrier PC2 through second connecting member M2. This faster reduced rotation from second ring gear R2 is slower than the input rotation from input shaft 1. The power flow in fourth gear is as shown in FIG. 4A. Torque acts through first clutch C1, third clutch C3, center member CM, first member M1, and second member M2, shown in bold lines, and first planetary gearset G1, second planetary gearset G2, and third planetary gearset G3 not including fourth sun gear S4, shown in hatching.

(Fifth gear) In fifth gear, as shown in FIG. 2, first clutch C1 which was engaged in fourth gear is disengaged, and second clutch C2 is engaged instead. Therefore, fifth gear is achieved by engagement of second clutch C2 and third clutch C3. In fifth gear, reduced rotation from first planetary gearset G1 is input into third sun gear S3 through second sun gear S2 and first connecting member M1 by engagement of second clutch C2. Simultaneously, input rotation from input shaft 1 is input into third carrier PC3 through center member CM by engagement of third clutch C3.

Thus, at third planetary gearset G3, input rotation is input into third carrier PC3, and reduced rotation is input into third sun gear S3 from first planetary gearset G1, and as a result, rotation which is faster than the input rotation is output to output gear 2 from third ring gear R3. The power flow in fifth gear is as shown in FIG. 4B. Torque acts through second clutch C2, third clutch C3, center member CM, and first connecting member M1, shown in bold lines, and first planetary gearset G1, second sun gear S2, and third planetary gearset G3 not including fourth sun gear S4, shown in hatching.

(Sixth gear) In sixth gear, as shown in FIG. 2, second clutch C2 which was engaged in fifth gear is disengaged, and second brake B2 is engaged instead. Therefore, sixth gear is achieved by engagement of third clutch C3 and second brake B2. In sixth gear, input rotation from input shaft 1 is input into third carrier PC3 through center member CM of third planetary gearset G3 by engagement of third clutch C3. Also, fourth sun gear S4 of third planetary gearset G3 is fixed to transmission case 3 by engagement of second brake B2.

Thus, at third planetary gearset G3, input rotation is input into third carrier PC3, and fourth sun gear S4 is fixed to transmission case 3, and as a result, rotation which is faster than the input rotation is output to output gear 2 from third ring gear R3. The power flow in sixth gear is as shown in FIG. 4C. Torque acts through third clutch C3, second brake B2, and center member CM, shown in bold lines, and third planetary gearset G3 not including third sun gear S3, shown in hatching.

(Reverse gear) As shown in FIG. 2, reverse gear, is achieved by engagement of second clutch C2 and first brake B1. In reverse gear, reduced rotation from first planetary gearset G1 is input into third sun gear S3 through second sun gear S2 and first connection member M1 by engagement of second clutch C2. At the same time, by engagement of first brake B1, third carrier PC3 is fixed to transmission case 3. Thus, at third planetary gearset G3, normal-direction reduced rotation is input into third sun gear S3, and third carrier PC3 is fixed to transmission case 3, and as a result, reverse-direction rotation that has been reduced in speed is output to output gear 2 from third ring gear R3.

The power flow in reverse gear is as shown in FIG. 5. Torque acts through second clutch C2, first brake B1, first connecting member M1, and outer member OM, shown in bold lines, and first planetary gearset G1, second sun gear S2, and third planetary gearset G3 except fourth sun gear S4, shown in hatching.

Figure 6:
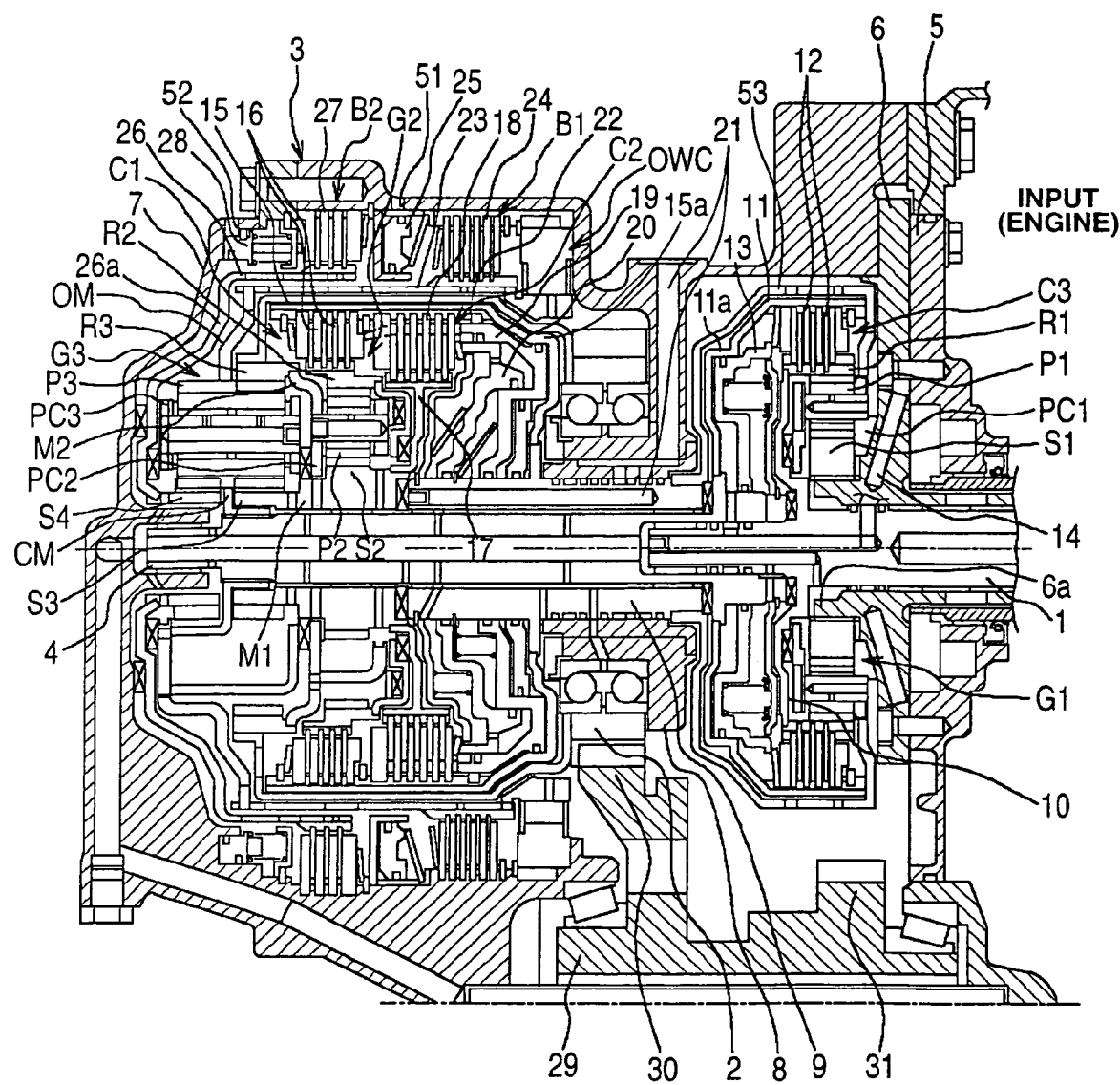
FIG. 6 is a cross-sectional view showing the same automatic transmission.
Figure 7:
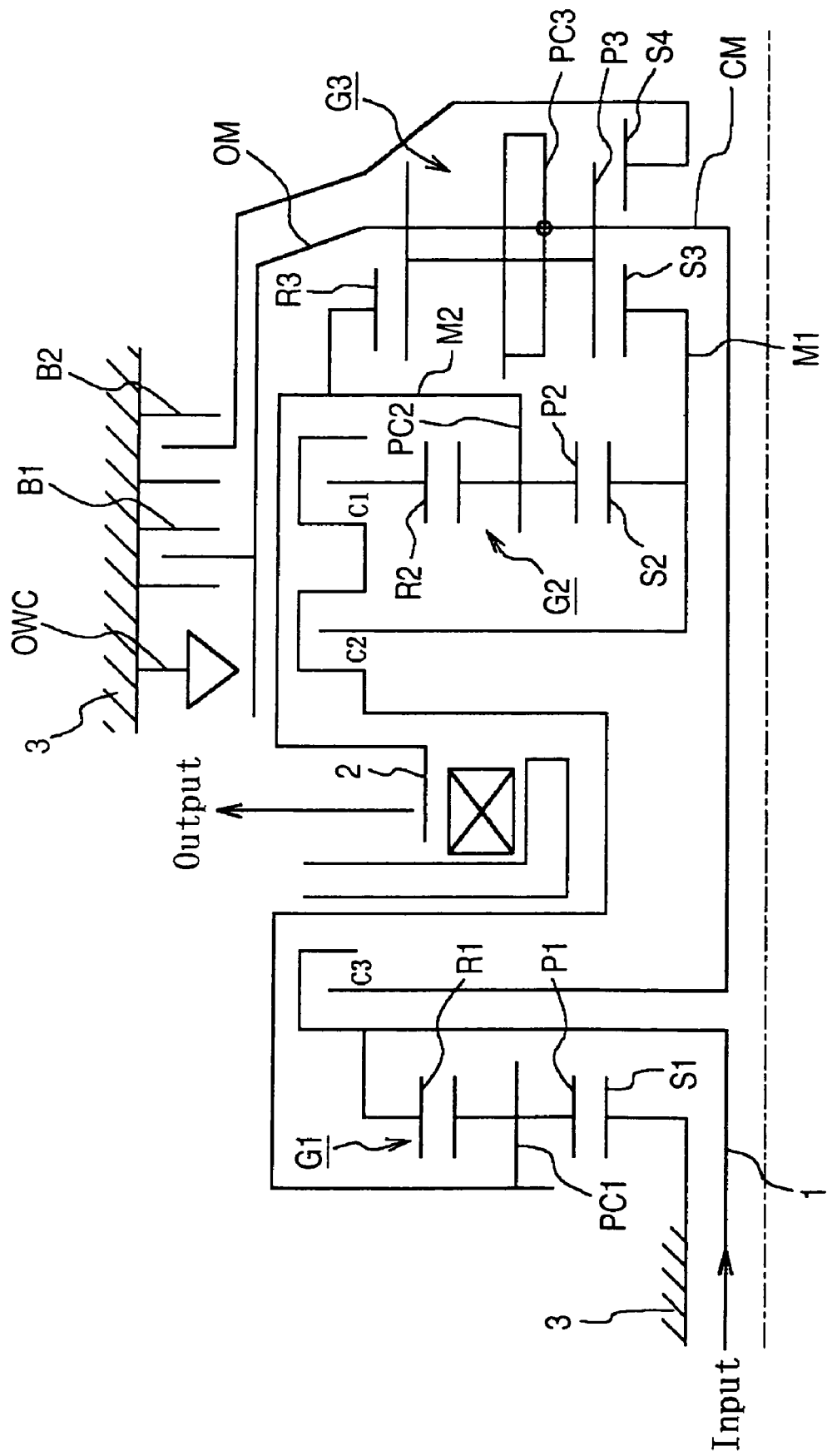
FIG. 7 is a skeleton diagram showing physical location of internal elements of the same automatic transmission.
Figure 8:
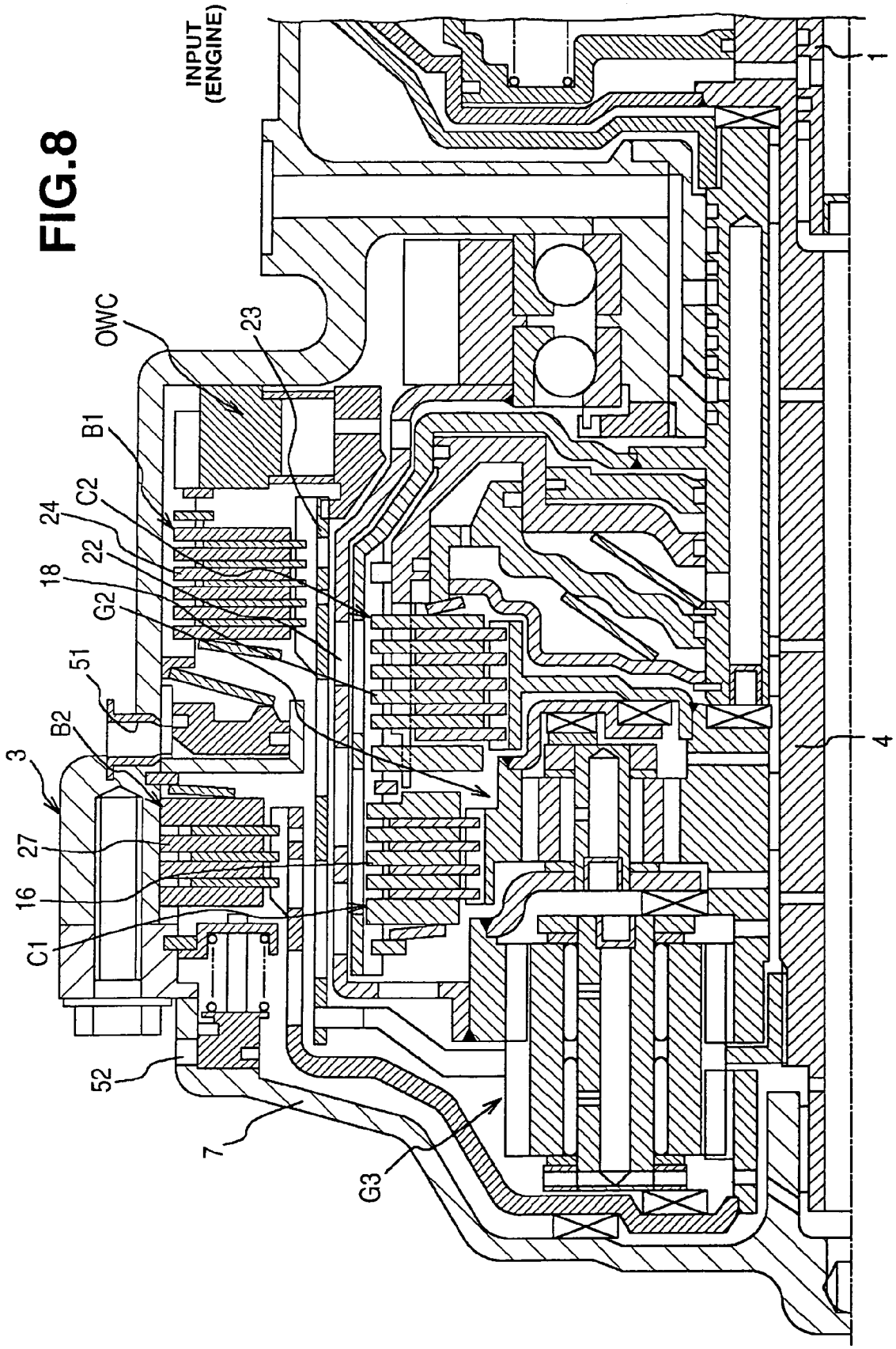
FIG. 8 is an enlarged cross-sectional diagram showing detail of the same automatic transmission.
Figure 9:
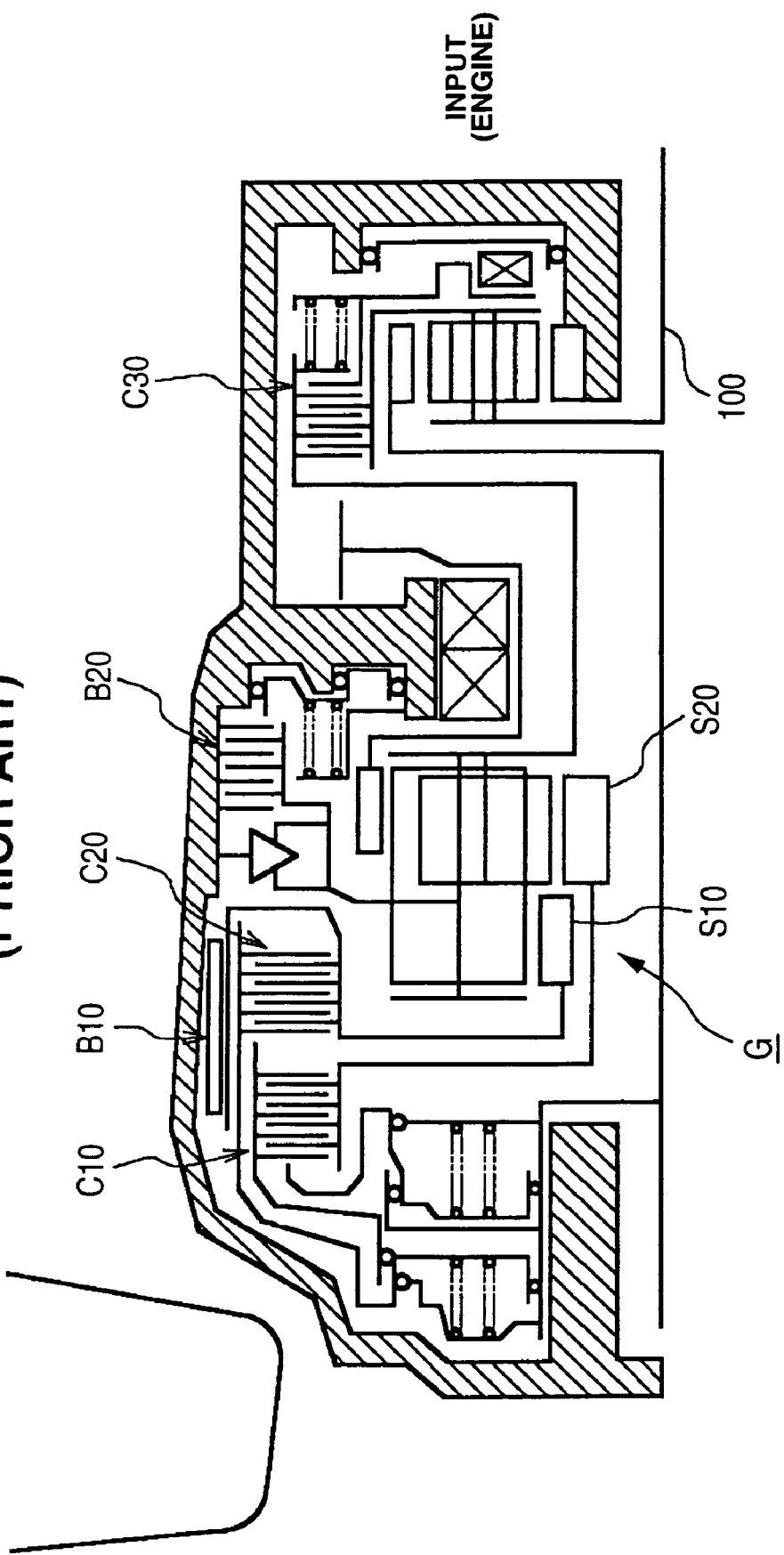
FIG. 9 is a cross-sectional view of an automatic transmission using a Ravigneaux compound planetary gear train according to the related art.

Below, in discussion of the automatic transmission according to the present invention based on FIGS. 6 and 8, the orientation of the automatic transmission in FIGS. 6 and 8 is opposite to that of FIGS. 1, 3 through 5, and 7. That is, an engine would be connected on the left side in FIGS. 1, 3 through 5, and 7 and power flows from left to right, whereas in FIGS. 6 and 8, an engine would be connected on the right side and therefore power flow would be from right to left. Referring to FIG. 6, input shaft 1 and a middle shaft 4 are disposed in transmission case 3 so that a rear end of input shaft 1 is supported in a front end of middle shaft 4 to form a fitting portion, such that input shaft 1 is coaxially rotatable relative to middle shaft 4. Input shaft 1 and middle shaft 4 are supported to be individually and freely rotatable with respect to transmission case 3.

A front end opening of transmission case 3 near input shaft 1 is closed by an oil pump which comprises a pump housing 5 and a pump cover 6, and input shaft 1 is passed through the oil pump to be axially supported thereby. An end of input shaft 1 protruding from the oil pump is connected to an engine (not shown) via a torque converter (not shown).

A rear end of middle shaft 4 which is away from input shaft 1 is supported to be freely rotatable by a case end 7 at a rear end of transmission case 3. A midway wall 8 is disposed approximately halfway axially inside transmission case 3, and output gear 2 is supported thereon to be freely rotatable. A hollow shaft 9 is disposed in a center opening of midway wall 8, and the fitting portion of input shaft 1 and middle shaft 4 is supported to be freely rotatable inside hollow shaft 9 by the center hole of midway wall 8.

As shown in FIGS. 6 and 7, first planetary gearset G1 is disposed in a space existing in a front portion of the automatic transmission between the oil pump comprised of pump housing 5 and pump cover 6 and midway wall 8, and, third clutch C3 is disposed so as to enclose first planetary gearset G1. Referring to first planetary gearset G1, first sun gear S1 is serration fitted to a center boss portion 6a projecting from a rear of pump cover 6 to be permanently non-rotatable so as to function as a reaction force stopper, and first ring gear R1 which is a rotation input member is joined to an outer perimeter of a flange 10 which extends radially outward away from the axis from input shaft 1.

A clutch drum 11 extends radially outward away from the axis from a front end of middle shaft 4 near input shaft 1 and encloses first ring gear R1. Third clutch C3, which serves as a direct clutch, is disposed about an outer circumference of first planetary gearset G1, third clutch C3 comprising a clutch pack 12 and a clutch piston 13 which will be discussed later. Clutch pack 12 comprises alternating clutch plates respectively splined to an inner circumference of clutch drum 11 and an outer circumference of first ring gear R1. First ring gear R1 also serves as a clutch hub of third clutch C3. Further, clutch piston 13, which is a clutch piston of third clutch C3, is disposed on a side of first planetary gearset G1 away from the oil pump which is comprised of pump housing 5 and pump cover 6, and clutch piston 13 is slidably fitted to a front end of middle shaft 4 and a cylinder 11a of clutch drum 11 which faces first planetary gearset G1.

Third clutch C3 is engageable by third clutch piston 13 traveling to the right of FIG. 6 after having received line pressure supplied via a fluid passage 14 from a control valve body. A connecting shell 53, which is drum-shaped, extends radially outward away from the axis from a front end of hollow shaft 9, continues on to enclose third clutch C3, and continues further so that a front end of connecting shell 53 is joined to first carrier PC1. First carrier PC1, as obvious from the previous explanation, constitutes a rotation output member of first planetary gearset G1 which serves as a reduction planetary gearset.

As shown in FIGS. 6 through 8, first clutch C1, second clutch C2, first brake B1, and second brake B2 are disposed in a space which exists between midway wall,8 and case end 7.

Second planetary gearset G2 and third planetary gearset G3 are disposed about middle shaft 4, second planetary gearset G2 being positioned nearer to input shaft 1 than third planetary gearset G3. Second sun gear S2 of second planetary gearset G2 and third sun gear S3 of third planetary gearset G3 are joined to form a single integral body by first connecting member M1 and are supported to be freely rotatable by middle shaft 4. A clutch drum 15 extends radially outward away from the axis from approximately halfway of hollow shaft 9, continues on to extend axially toward the rear of transmission case 3, and continues further somewhat past an outer circumference of second ring gear R2. First clutch C1 is comprised of a clutch pack 16 and a clutch piston 19. Clutch pack 16 is comprised of alternating clutch plates respectively splined to an inner circumference of clutch drum 15 and an outer circumference of second ring gear R2.

As discussed above, second clutch C2 is disposed nearer to input shaft 1 than first clutch C1 which is disposed on an outer circumference of second planetary gearset G2, so a clutch hub 17 which extends radially outward away from the axis is fixedly installed to an outer edge of an input shaft of second sun gear S2. Second clutch C2 is comprised of a clutch pack 18 and a clutch piston 20 which will be discussed hereinafter. Clutch pack 18 is comprised of alternating clutch plates respectively splined to an inner circumference of clutch drum 15 and an outer circumference of clutch hub 17. Further, clutch piston 19 of first clutch C1 and clutch piston 20 of second clutch C2 form a double piston which is disposed on a side of second clutch C2 away from first clutch C1, clutch piston 20 being slidable on an inner side of clutch piston 19. An outer circumference of clutch piston 19 is fitted to be freely slidable on an inner circumference of a cylinder 15a of clutch drum 15 which faces second planetary gearset G2. A plurality of fluid passages 21, of which a representative fluid passage is shown in FIG. 6, are formed in midway wall 8 and hollow shaft 9. First clutch C1 and second clutch C2 are individually engageable, by clutch piston 19 and clutch piston 20 traveling to the left of FIG. 6 after receiving line pressure from individual fluid passages of the plurality of fluid passages 21.

As mentioned before, third planetary gearset G3 is a double-sun-gear planetary gearset, and third planet-pinions P3 are relatively long in order to mesh with both third sun gear S3 and fourth sun gear S4. However, a width of third ring gear R3 does not need to be as large as that of third planet-pinions P3, and therefore third ring gear R3 is fabricated so that a face width of the teeth thereof is smaller than a face width of the teeth of third planet-pinions P3. By third ring gear R3 being meshed with third planet-pinions P3 at an end portion of third planet-pinions P3 near second planetary gearset G2, second connecting member M2 which joins third ring gear R3 and second carrier PC2 of second planetary gearset G2 can be designed smaller. An output drum 22 is disposed so as to enclose clutch drum 15 of first clutch C1 and second clutch C2, and serves as an output member of the compound planetary gear train which comprises second planetary gearset G2 and third planetary gearset G3. One end of output drum 22 is attached to an outer circumference of third ring gear R3, and another end thereof is attached to output gear 2.

The output member of the compound planetary gear train is disposed outside the respective outer circumferences of first clutch C1 and second clutch C2 and inside the respective inner circumferences of first brake B1 and second brake B2. Further, by disposing the output member of the compound planetary gear train in this way radially beyond the respective outer circumferences of first clutch C1 and second clutch C2 which are engageable to direct reduced rotation, as well as radially within the respective inner circumferences of first brake B1 and second brake B2, both of which will be discussed in detail later, it is possible to form the output member, being output drum 22, with a large diameter, which is favorable in terms of strength. Thus, according to the embodiment of the present invention, a thickness of output drum 22 is designed to be smaller than is generally so in the related art, while retaining sufficient strength characteristics.

As has been discussed, center member CM is disposed on third carrier PC3 of third planetary gearset G3 to extend radially inward toward the axis between third sun gear S3 and fourth sun gear S4, and outer member OM is disposed on third carrier PC3 at a position approximately halfway axially of third planet-pinions P3 and extends radially outward away from the axis and along a rear face of third ring gear R3. Center member CM is connected to middle shaft 4, and third carrier PC3 is thereby connected to clutch drum 11 of third clutch C3 via center member CM and middle shaft 4. A brake hub 23 is joined to an outer circumference of outer member OM, and is disposed about an outer circumference of output drum 22 and extends toward the front of the transmission to within proximity of midway wall 8. First brake B1 is comprised of brake pack 24 and brake piston 25. Brake pack 24 is comprised of alternating plates respectively splined to an inner circumference of brake hub 23 and an inner circumference of transmission case 3. Brake piston 25 of first brake B1 is fitted to the inside of transmission case 3 behind brake pack 24, and first brake B1 is appropriately engageable by brake piston 25.

A brake hub 26 is disposed so as to overlap a rear end of brake hub 23, and an end wall 26a of brake hub 26 extends inward toward the axis along and behind third planetary gearset G3, and an inner circumference of rear wall 26a of brake hub 26 is joined to fourth sun gear S4 of third planetary gearset G3. Second brake B2 is comprised of a brake pack 27 and a brake piston 28. Brake pack 27 is comprised of alternating plates respectively splined to an inner circumference of transmission case 3 and an outer circumference of brake hub 26. Brake piston 28 of second brake B2 is fitted to the inside of transmission case 3 behind brake pack 27, and second brake B2 is appropriately engageable by brake piston 28.

Therefore, first brake B1 and second brake B2 are respectively disposed around second clutch C2 and around first clutch C1 respectively, and first brake B1 is disposed nearer to input shaft 1 and first planetary gearset G1 than second brake B2. First brake B1 and second brake B2 are disposed axially in a row and nearer to second planetary gearset G2 than third planetary gearset G3.

The disposition of second planetary gearset G2, third planetary gearset G3, first clutch C1, second clutch C2, first brake B1, and second brake B2 in accordance with the embodiment of the present invention will now be discussed in more detail. As shown in FIGS. 7 and 8, first clutch C1 and second clutch C2, which direct reduced rotation, are disposed radially beyond the compound planetary gear train which is comprised of second planetary gearset G2 and third planetary gearset G3, that is, first clutch C1 and second clutch C2 are disposed outside and around the compound planetary gear train. First brake B1 and second brake B2 are respectively disposed radially beyond the circumferences of first clutch C1 and second clutch C2, that is, first brake B1 and second brake B2 are individually disposed around second clutch C2 and first clutch C1 respectively, such that one of first clutch C1 and second clutch C2 and one of first brake B1 and second brake B2 overlap at least partially in the axial direction, and the other of first clutch C1 and second clutch C2 and the other of first brake B1 and second brake B2 overlap at least partially in the axial direction.

More specifically, second brake B2 is disposed around the circumference of first clutch C1 so that clutch pack 16 of first clutch C1 and brake pack 27 of second brake B2 greatly overlap in the axial direction. Also, second brake B2 is disposed far enough toward the rear of the transmission, so that clutch pack 18 of second clutch C2 and brake pack 24 of first brake B1 overlap in the axial direction. Also, first clutch C1 and second clutch C2 are positioned in a row axially.

As shown in FIG. 8, working fluid to first brake B1 is supplied through an opening member 51 which is disposed in the enclosing wall of transmission case 3, and working fluid to second brake B2 is supplied through an opening portion 52 which is disposed in case end 7. At the same time, lubricating oil flows radially outward away from the axis from within middle shaft 4, and is supplied to first clutch C1, second clutch C2, first brake B1, second brake B2, and other elements. With that in consideration, first clutch C1, second clutch C2, first brake B1, and second brake B2 are positioned axially close together to facilitate the layout of fluid passages with respect to the axial direction. The fluid passage structure is thus simplified, especially with regard to lubricating oil.

Further, a one-way clutch OWC, which was omitted in the skeleton diagrams of FIGS. 1 and 3 through 5, is disposed between transmission case 3 and a front of brake hub 23 which constitutes first brake B1, as shown in FIGS. 6, 7, and 8. Forward first gear is achievable even with first brake B1 in a disengaged state due to one-way clutch OWC stopping rotation of third carrier PC3 in one direction. However, while first gear can be achieved through provision of one-way clutch OWC, one-way clutch OWC allows reverse-direction rotation of third carrier PC3 during engine braking. Engine braking is therefore not effective in this case. When engine braking is required, first brake B1 is engaged to stop reverse-direction rotation of third carrier PC3. A counter shaft 29 is supported to be freely rotatable inside transmission case 3, and is parallel to input shaft 1 and middle shaft 4. A countergear 30 and a final drive pinion 31 are formed integrally with counter shaft 29, countergear 30 meshing with output gear 2, and final drive pinion 31 meshing with a differential gear assembly of drive wheels of a vehicle (not shown) are formed integrally with counter shaft 29.

According to the embodiment of the present invention, referring to FIGS. 6 through 8, at a position which is radially beyond and along first clutch C1 and second clutch C2 which direct reduced rotation, one of first clutch C1 and second clutch C2 and one of first brake B1 and second brake B2 overlap at least partially in the axial direction, and the other of first clutch C1 and second clutch C2 and the other of first brake B1 and second brake B2 overlap at least partially in the axial direction. It therefore becomes possible to axially shorten the transmission case. And since it is possible to position first clutch C1 and second brake B2 axially closer to second clutch C2 and first brake B1 respectively, layout of fluid passages is facilitated in the axial direction and fluid passage structure is thereby simplified.

Further, the greater the overlap between one clutch and one brake (according to the embodiment, first clutch C1 and second brake B2) and between the other clutch and the other brake (according to the embodiment, second clutch C2 and first brake B1), the more noticeable the beneficial effects of the present invention are. It is therefore preferable to dispose first clutch C1 and second brake B2 as well as second clutch C2 and first brake B1 to overlap as much as can be allowed by the particular arrangement of a given transmission assembly.

With respect to the radial dimension of the transmission assembly, second planetary gearset G2 and third planetary gearset G3 which constitute the compound planetary gear train are single-pinion, so the compound planetary gear train can be designed with a smaller diameter. Moreover, by making third planetary gearset G3 of the compound planetary gearset a double-sun-gear planetary gearset having two sun gears, it is possible for second ring gear R2 to serve as the input member of the compound planetary gear train for reduced rotation from the reduction planetary gearset, being first planetary gearset G1. Compared to a sun gear serving as an input member, there is less tangential stress present with a ring gear acting as the input member, and is therefore advantageous with respect to a number of points including gear strength, gear life, and carrier rigidity, and it is possible to make a diameter of the compound planetary gear train smaller.

Also, in an automatic transmission according to the embodiment of the present invention, output drum 22 acts as an output member of the compound planetary gear train which comprises single-pinion planetary gearset G2 and double-sun-gear planetary gearset G3, and is disposed radially beyond the respective outer circumferences of first clutch C1 and second clutch C2 as well as radially within the respective inner circumferences of first brake B1 and second brake B2. This allows output drum 22 to be made with a larger diameter, which is an advantage with respect to strength. With a larger diameter, output drum 22 can then be designed with a smaller thickness and still retain sufficient strength for transmitting high torque. This makes it possible to more effectively design a smaller transmission.

This application is based on a prior Japanese Patent Application No. P2002-207345. The entire contents of a Japanese Patent Application No. P2002-207345 with a filing date of Jul. 16, 2002 are hereby incorporated by reference.

Although the invention has been described above by reference to an embodiment of the invention, the invention is not limited to the embodiment described above. Modifications and variations of the embodiment described above will occur to those skilled in the art in light of the above teachings.

For example, the present invention can be applied in an instance where first planetary gearset G1 is a double-pinion planetary gearset with two sets of planet-pinion gears where the rotation input member is first carrier PC1, and the rotation output member is first ring gear R1.

Also, the present invention can be applied to an automatic transmission where there are more than three planetary gearsets.

The scope of the invention is defined with reference to the following claims.

What is claimed is:

1. An automatic transmission which has at least six selectable forward speeds, the automatic transmission comprising:
   a reduction planetary gearset which reduces speed of rotation input from an engine;
   a plurality of planetary gearsets disposed behind the reduction planetary gearset, the plurality of planetary gearsets comprising a ring gear as an input member which inputs reduced rotation from the reduction planetary gearset, individual planetary gearsets respectively comprising a single set of pinion gears;
   a plurality of clutches which are disposed radially beyond the plurality of planetary gearsets; and
   a plurality of brakes which are disposed radially beyond the plurality of clutches, the forward speeds of the transmission being selectable through a combination of engagement and disengagement of the plurality of clutches and the plurality of brakes, each brake overlapping with a corresponding clutch in the axial direction,
   wherein the plurality of planetary gearsets further comprises an output member which is disposed outside an outer circumference of the plurality of clutches and inside an inner circumference of the plurality of brakes.

2. The automatic transmission as claimed in claim 1, wherein the plurality of brakes are disposed axially in a row, each brake of which respectively comprising a brake pack.

3. The automatic transmission as claimed in claim 2, wherein each brake pack overlaps with a corresponding clutch of the plurality of clutches at least partially in the axial direction.

4. The automatic transmission as claimed in claim 2, wherein each clutch comprises a clutch pack, each brake pack overlapping with the corresponding clutch pack at least partially in the axial direction.

5. The automatic transmission as claimed in claim 2, wherein the brake pack of one brake greatly overlaps in the axial direction with the corresponding clutch of the plurality of clutches, and the brake pack of another brake overlaps in the axial direction at least partially the corresponding clutch of the plurality of clutches.

6. The automatic transmission as claimed in claim 1, wherein the plurality of brakes comprises two brakes which respectively overlap with the corresponding clutch in the axial direction.

7. The automatic transmission as claimed in claim 6, wherein each of the two brakes respectively comprises a brake pack which overlaps with the corresponding clutch of the plurality of clutches in the axial direction.

8. The automatic transmission as claimed in claim 7, wherein at least one brake pack of one of the two brakes overlaps greatly with the corresponding clutch.

9. An automatic transmission which has at least six selectable forward speeds, the automatic transmission comprising:
a reduction planetary gearset which reduces speed of rotation input from an engine;
a plurality of planetary gearsets disposed behind the reduction planetary gearset, the plurality of planetary gearsets comprising a ring gear as an input member which inputs reduced rotation from the reduction planetary gearset, individual planetary gearsets respectively comprising a single set of pinion gears;
a plurality of clutches which are disposed radially beyond the plurality of planetary gearsets; and
a plurality of brakes which are disposed radially beyond the plurality of clutches, the forward speeds of the transmission being selectable through a combination of engagement and disengagement of the plurality of clutches and the plurality of brakes, each brake overlapping with a corresponding clutch in the axial direction,
wherein the plurality of planetary gearsets further comprises an output drum as an output member which is disposed radially beyond the plurality of clutches and radially within the plurality of brakes.

10. The automatic transmission as claimed in claim 9, wherein the plurality of planetary gearsets further comprises a double-sun-gear planetary gearset.

11. An automatic transmission which has at least six selectable forward speeds, the automatic transmission comprising:
a reduction planetary gearset;
a rear planetary gear train disposed behind the reduction planetary gearset, the rear planetary gear train comprising
a first rear planetary gearset which is disposed behind the reduction planetary gearset to receive a reduced rotation therefrom, the first rear planetary gearset comprising a sun gear, a single set of pinion gears meshing with the sun gear, and a ring gear meshing with the single set of pinion gears, the ring gear being an input member which inputs the reduced rotation from the reduction planetary gearset, and
a second rear planetary gearset which is disposed behind the first rear planetary gearset, the second rear planetary gearset comprising a single set of pinion gears;
a plurality of clutches disposed in a row around the rear planetary gear train; and
a plurality of brakes disposed in a row around the plurality of clutches, the plurality of brakes comprising a first brake which overlaps in the axial direction with a first clutch of the plurality of clutches, and a second brake which overlaps in the axial direction with a second clutch of the plurality of clutches,
wherein the first brake and the second brake of the plurality of brakes each comprises a set of plates, the set of plates of the first brake overlapping in the axial direction with the first clutch of the plurality of clutches, the set of plates of the second brake overlapping in the axial direction with the second clutch of the plurality of clutches.

12. The automatic transmission as claimed in claim 11, wherein a set of plates of the first brake greatly overlap with the first clutch and the set of plates of the second brake overlap at least partially with the second clutch.

13. The automatic transmission as claimed in claim 11, wherein the rear planetary gear train further comprises a drum which is disposed between the plurality of clutches and the plurality of brakes, the drum being joined to an output gear which meshes with a counter gear.

14. An automatic transmission comprising:
an input member which inputs an engine rotation;
a planetary gear train to receive the engine rotation from the input member, the planetary gear train comprising
a first planetary gearset acting as a reduction planetary gearset which inputs the engine rotation from the input member,
a second planetary gearset disposed behind the first planetary gearset, the second planetary gearset comprising a sun gear, planetary pinions which mesh with the sun gear, a pinion carrier which supports the planetary pinions to be freely rotatable, and a ring gear which meshes with the planetary pinions, the ring gear acting as a planetary-gear-train input member which inputs reduced rotation from the first planetary gearset, and
a third planetary gearset disposed behind the second planetary gearset, the third planetary gearset comprising two sun gears, common planetary pinions which mesh with the two sun gears, a pinion carrier which supports the planetary pinions to be freely rotatable, and a ring gear which meshes with the planetary pinions;
an output member disposed coaxially with the input member, the output member receiving a rotation from the planetary gear train; and
three clutches and two brakes, at least six forward speeds and reverse speed being selectable by selective engagement and disengagement of the three clutches and the two brakes, two clutches of the three clutches being disposed around the planetary gear train, the two brakes being disposed around the two clutches, one clutch of the two clutches and one brake of the two brakes overlapping in the axial direction at least partially, the other clutch of the two clutches and the other brake of the two brakes overlapping in the axial direction at least partially, wherein the planetary gear train further comprises a planetary-gear-train output member which is disposed outside respective outer circumferences of the two clutches and inside respective inner circumferences of the two brakes.

15. An automatic transmission comprising:

an input member which inputs an engine rotation;

a planetary gear train to receive the engine rotation from the input member, the planetary gear train comprising
- a first planetary gearset acting as a reduction planetary gearset which inputs the engine rotation from the input member,
- a second planetary gearset disposed behind the first planetary gearset, the second planetary gearset comprising a sun gear, planetary pinions which mesh with the sun gear, a pinion carrier which supports the planetary pinions to be freely rotatable, and a ring gear which meshes with the planetary pinions, the ring gear acting as a planetary-gear-train input member which inputs reduced rotation from the first planetary gearset, and
- a third planetary gearset disposed behind the second planetary gearset, the third planetary gearset comprising two sun gears, common planetary pinions which mesh with the two sun gears, a pinion carrier which supports the planetary pinions to be freely rotatable, and a ring gear which meshes with the planetary pinions;

an output member disposed coaxially with the input member, the output member receiving a rotation from the planetary gear train; and three clutches and two brakes, at least six forward speeds and reverse speed being selectable by selective engagement and disengagement of the three clutches and the two brakes, two clutches of the three clutches being disposed around the planetary gear train, the two brakes being disposed around the two clutches, one clutch of the two clutches and one brake of the two brakes overlapping in the axial direction at least partially, the other clutch of the two clutches and the other brake of the two brakes overlapping in the axial direction at least partially, wherein the two clutches respectively comprise a set of plates, and the two brakes respectively comprise a set of plates, the set of plates of one brake overlapping in the axial direction at least partially with the set of plates of one clutch, the set of plates of the other brake overlapping in the axial direction at least partially with the set of plates of the other clutch.

16. The automatic transmission as claimed in claim 14, wherein the planetary gear train further comprises an output drum to transmit rotation of the planetary gear train to the output member, the output drum being disposed between the two clutches and the two brakes.

* * * * *